Patented Nov. 28, 1939

2,181,297

UNITED STATES PATENT OFFICE 2,181,297

HYDROLYSIS OF 1,3-DIHALO-ISOBUTANES

Edgar C. Britton and Gerald H. Coleman, Midland, Mich., assignors to The Dow Chemical Company, Midland, Mich., a corporation of Michigan No Drawing. Application February 1, 1937,
Serial No. 123,492

9 Claims. (Cl. 260—601)

This invention relates to the hydrolysis of poly-halo-aliphatic hydrocarbons, and is particularly concerned with a method for the hydrolysis of the 1,3-dihalo-isobutanes. The term "1,3-dihalo-isobutane" as hereinafter employed refers to the compounds 1,3-dichloro-isobutane, 1-chloro-1-bromo-isobutane, and 1,3-dibromo-isobutane.

In the halogenation of isobutane considerable quantities of poly-halo-isobutanes are formed, from which the 1,3-dihalo-isobutanes may be readily separated, as by fractional distillation. We have found that these 1,3-dihalo-isobutanes can be treated with a suitable hydrolyzing agent, such as aqueous sodium hydroxide, calcium hydroxide, etc., to form a mixed product comprising alcohol, aldehyde, ether, and ester compounds.

In carrying out our process a 1,3-dihalo-isobutane is treated with an aqueous alkaline hydrolyzing agent, under conditions of temperature and pressure adapted to promote the hydrolysis thereof. We generally prefer to react at least one equivalent of hydrolyzing agent per mol of 1,3-dihalo-isobutane employed, although greater or lesser amounts of such alkaline agent may be employed. The conditions under which the reaction is carried out vary with the particular reactants employed and the nature of reaction product desired. In the case of the 1,3-dibromo-isobutane, temperatures as low as 75° C. may be employed, while, in the hydrolysis of the 1,3-dichloro- compound, reaction temperatures up to 200° C. or higher may be desirable, depending upon the hydrolyzing agent employed. When operating at the refluxing temperature of the reaction mixture or below, the hydrolysis is conveniently carried out at atmospheric pressure. When temperatures in excess of such refluxing temperature are employed, the reaction is carried out under pressure corresponding to the vapor pressure of the reaction mixture. The time required for the completion of the reaction is dependent upon the particular 1,3-dihalo-compound and hydrolyzing agent employed, the concentration of the hydrolyzing agent, the temperature of hydrolysis, the degree of conversion, and the ratio of alcohol, aldehyde, etc., desired in the product.

After the desired degree of reaction is obtained, the crude mixture can be subjected to various purification steps and the desired products isolated therefrom. For example, the mixture may be steam-distilled to recover an oily product comprising unreacted 1,3-dihalo-isobutane and miscellaneous water-immiscible alcohol, aldehyde, ether, and ester products from which the constituents may be readily separated. The reacted mixture may be neutralized prior to such steam-distillation, whereby larger proportions of alcoholic derivatives are recovered in the distillate. As an alternative method the mixture may be neutralized with dilute inorganic acid and subsequently extracted with a water-immiscible organic solvent to separate the major proportion of the reaction products therefrom. If desired, prior to the above treatment, the crude product may be concentrated, as by evaporation under reduced pressure.

The following examples are illustrative of various modes of applying the invention, but are not to be construed as limiting the same:

*Example 1*

381 grams (3 mols) of 1,3-dichloro-isobutane, 264 grams (6.6 mols) of sodium hydroxide, and 772 grams (42.3 mols) of water were charged into a stainless steel rotor bomb, warmed to, and maintained at, 175° C. over a period of 23 hours. The reaction mixture was then cooled and steam-distilled, whereby there was obtained 88.5 grams of an oily mixture as a layer of the distillate. Titration of an aliquot proportion of the aqueous residue from the steam-distillation indicated a conversion of 90 per cent of theoretical, as calculated on the basis of both chlorines in the 1,3-dichloro-isobutane reacting. Both the oily and aqueous layers of the steam-distillate and the aqueous residue therefrom, were worked up by the usual methods of fractional distillation, extraction with organic solvents, and concentration by evaporation, whereby there was isolated, in substantially pure form, isobutyraldehyde, isobutenol, 1-chloro-3-hydroxy-isobutane, and 1,3-dihydroxy-isobutane. As a residue, upon the distillation of the above compounds, there was obtained a high boiling, viscous mixture consisting of polyglycols, complex ether and ester derivatives, aldehyde condensation products, and a plastic material insoluble in water, soluble in ethylene chloride, brittle when cold, and olive-green in color.

Portions of the 1-chloro-3-hydroxy-isobutane and 1,3-dihydroxy-isobutane, as obtained above, were treated with benzoyl chloride in the presence of sodium hydroxide whereby there were obtained the benzoate of 1-chloro-3-hydroxy-isobutane as an oil boiling at 127°–128.5° C. at 60 mm. pressure, and the dibenzoate of 1,3-dihydroxy-isobutane boiling at 235°–240° C. at 15 mm. pressure.

*Example 2*

In a similar manner 1 mol of 1,3-dichloro-isobutane, 2.2 mols of sodium hydroxide, and 28.2 mols of water were reacted in a copper-lined rotor bomb at 175° C. for 5 hours. Titration of an aliquot portion of the reaction mixture indicated a conversion of 94 per cent of theoretical. The mixture was worked up in the usual manner to obtain the same products enumerated in Example 1.

*Example 3*

2 mols of 1,3-dichloro-isobutane, 2.2 mols of calcium hydroxide, and 56.5 mols of water were reacted in a stainless steel rotor bomb substantially as described above for a period of 10 hours at 175° C., a conversion of 82.6 per cent of theoretical being obtained. A considerable quantity of gaseous product was obtained which was tentatively identified as isobutylene. The reaction mixture was worked up in the usual manner to obtain the products described in Example 1.

*Example 4*

63.5 grams (0.5 mol) of 1,3-dichloro-isobutane, 3.2 grams (1.08 mols) of sodium hydroxide, and 387 grams of water were mixed together and refluxed at a temperature of approximately 94° C. for 8 hours, at the end of which time the conversion of the mixture on the basis of one chlorine reacting was 97.2. The crude mixture was worked up in the usual manner.

*Example 5*

0.5 mol of 1,3-dichloro-isobutane, 1.08 mols of potassium hydroxide, and 21.5 grams of water were reacted substantially as described in Example 4. At the end of 8 hours of refluxing at 94° C. the conversion of the mixture was found to be 93.4 per cent of theoretical, based on one chlorine. The reaction product was worked up in the usual manner.

The 1-chloro-3-hydroxy-isobutane obtained in the above examples was a water-white liquid, somewhat soluble in water, and showing a negative reaction to the Fuchsin-aldehyde test. This compound boiled at 160°–165° C. (uncorrected) at atmospheric pressure and formed a benzoate on treatment with benzoyl chloride as described in Example 1.

In a similar manner, 1,3-dibromo-isobutane and 1-bromo-3-chloro-isobutane may be hydrolyzed as described in the above examples. The temperatures required to effect the hydrolysis are somewhat lower when these compounds are employed, but in general the procedures followed do not differ materially from those described.

Other alkaline hydrolyzing agent such as sodium carbonate, potassium carbonate, calcium carbonate, barium hydroxide, sodium bicarbonate, sodium acetate, iron hydroxide, etc., may be substituted for those shown in the examples, the temperature and pressure of reaction varying with the particular reagent employed.

Other modes of applying the principle of our invention may be employed instead of those explained, change being made as regards the methods herein disclosed, provided the step or steps stated by any of the following claims or the equivalent of such stated step or steps be employed.

We therefore particularly point out and distinctly claim as our invention:

1. A method of preparing oxygen-containing saturated aliphatic compounds which comprises the step of reacting a 1,3-dihalo-isobutane with an aqueous alkaline agent at a temperature between 75° and 200° C.

2. A method of preparing oxygen-containing saturated aliphatic compounds which comprises the steps of reacting a 1,3-dihalo-isobutane with at least 1 molecular equivalent of an alkaline agent in the presence of water and at a temperature between 75° and 200° C., and thereafter separating the organic products of the reaction.

3. A method of preparing oxygen-containing saturated aliphatic compounds which comprises the steps of reacting 1,3-dichloro-isobutane with at least 1 molecular equivalent of an inorganic alkaline agent in the presence of water and at a temperature between 94° and 200° C., and thereafter separating the organic products of the reaction.

4. A method of preparing oxygen-containing saturated aliphatic compounds which comprises the steps of reacting 1,3-dichloro-isobutane with an aqueous solution of an alkaline agent at a temperature between 94° and 200° C. under pressure corresponding to the vapor pressure of the reaction mixture, and thereafter separating the organic products of the reaction.

5. In a method for the preparation of oxygen-containing saturated aliphatic compounds, the steps which consist in reacting 1,3-dichloro-isobutane with an aqueous sodium hydroxide solution at a temperature between 94° and 200° C., and thereafter separating the organic products of the reaction.

6. In a method for preparing oxygen-containing saturated aliphatic compounds, the steps which consist in reacting 1,3-dichloro-isobutane with at least 1 molecular equivalent of an aqueous sodium hydroxide solution at a temperature between 94° and 200° C., and thereafter separating the organic products of the reaction.

7. In a method for the preparation of oxygen-containing saturated aliphatic compounds, the steps which consist in reacting 1,3-dichloro-isobutane with an aqueous solution of sodium hydroxide at a temperature between 94° and 200° C. under pressure corresponding to the vapor pressure of the reaction mixture.

8. The method for the preparation of oxygen-containing saturated aliphatic compounds, which comprises the steps of reacting 1,3-dichloro-isobutane with calcium hydroxide in the presence of water and at a temperature between 94° and 200° C., and thereafter separating the organic products of the reaction.

9. In a method for the preparation of oxygen-containing saturated aliphatic compounds, the steps which consist in reacting 1,3-dichloro-isobutane with at least 1 molecular equivalent of calcium hydroxide in the presence of water and at a temperature between 94° and 200° C., and thereafter separating the organic products of the reaction.

EDGAR C. BRITTON.
GERALD H. COLEMAN.